(12) United States Patent
Meyer et al.

(10) Patent No.: US 11,460,342 B2
(45) Date of Patent: Oct. 4, 2022

(54) FASTENING SYSTEM FOR FASTENING AN OPTOELECTRONIC MEASURING DEVICE, IN PARTICULAR A LIGHT GRID, IN AN OPERATING POSITION

(71) Applicant: SICK AG, Waldkirch (DE)

(72) Inventors: Christof J. Meyer, Waldkirch (DE); Ralf Friedrich, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/371,353

(22) Filed: Jul. 9, 2021

(65) Prior Publication Data

US 2022/0011155 A1    Jan. 13, 2022

(30) Foreign Application Priority Data

Jul. 10, 2020  (DE) .......................... 102020118273.2

(51) Int. Cl.
*G01J 1/02*       (2006.01)
(52) U.S. Cl.
CPC .................................. *G01J 1/0271* (2013.01)
(58) Field of Classification Search
CPC ...... F16M 13/00; F16M 13/02; F16M 13/022; F21V 21/042; G01D 11/24; G01D 11/245; G01D 11/30; G01J 1/02; G01J 1/0266; G01J 1/0271; G01V 8/10; G01V 8/12; G01V 8/20; G02B 7/00; G02B 7/003; G02B 7/004
See application file for complete search history.

(56) References Cited

U.S. PATENT DOCUMENTS 7,085,471 B2 * 8/2006 Boeckel .................... G01V 8/20
  385/147
7,348,536 B2 * 3/2008 Bockel ...................... G01V 8/20
  250/221

(Continued)

FOREIGN PATENT DOCUMENTS

DE   102006009713 A1   6/2007
EP      2952937 A1    12/2015

OTHER PUBLICATIONS

German Office Action dated Dec. 22, 2020 corresponding to application No. 102020118273.2.

*Primary Examiner* — John R Lee
(74) *Attorney, Agent, or Firm* — Nath, Goldberg & Meyer; Jerald L. Meyer

(57) ABSTRACT

To enable a simple mounting and alignment of an optoelectronic measuring device in its operating position, a fastening system is provided for fastening the optoelectronic measuring device. The fastening system includes a fastening section provided at a surface of a housing of the measuring device. An adjustment adapter has a first element for connection to the fastening section and is provided for the alignment of the measuring device in the operating position. The fastening section rises from the surface of the housing and forms a platform having a groove and a latch cutout at at least one side located perpendicular to the surface of the housing. The first element of the adjustment adapter has a tongue element formed with shape matching the groove and a latching protrusion formed with shape matching the latch cutout. The fastening section and the adjustment adapter are latchingly connectable to one another without tools.

12 Claims, 4 Drawing Sheets

(56) References Cited

U.S. PATENT DOCUMENTS

| | | | |
|---|---|---|---|
| 9,291,303 B2* | 3/2016 | Friedrich | F16M 13/02 |
| 2005/0201086 A1* | 9/2005 | Friedrich | F16P 3/144 |
| | | | 362/217.13 |
| 2005/0207724 A1* | 9/2005 | Boeckel | G01V 8/20 |
| | | | 385/147 |
| 2006/0068624 A1* | 3/2006 | Boeckel | G01V 8/20 |
| | | | 439/159 |
| 2008/0055409 A1* | 3/2008 | Mars | G08B 13/19656 |
| | | | 348/E5.026 |
| 2013/0271977 A1 | 10/2013 | Ronen et al. | |
| 2014/0064825 A1* | 3/2014 | Friedrich | G01V 8/10 |
| | | | 29/428 |
| 2018/0279492 A1 | 9/2018 | Svedberg et al. | |
| 2022/0011155 A1* | 1/2022 | Meyer | G01J 1/0271 |

* cited by examiner

FASTENING SYSTEM FOR FASTENING AN OPTOELECTRONIC MEASURING DEVICE, IN PARTICULAR A LIGHT GRID, IN AN OPERATING POSITION

FIELD

The invention relates to a fastening system for fastening an optoelectronic measuring device, in particular a light grid, in an operating position.

BACKGROUND

More and more industrial applications are being automated today so that above all optoelectronic measuring devices, in particular light grids, are used to, for example, detect a zone or objects and to communicate corresponding signals to a control system. It is frequently necessary for this purpose to mount the optoelectronic measuring device in a specific operating position, with the optoelectronic measuring device being exactly aligned on the zone to be detected or on the object to be detected.

Known fastening systems are space consuming so that on the mounting of the optoelectronic measuring device in its operating position, the known fastening system can bring about a so-called blind zone of the optoelectronic measuring device. In this connection, a blind zone means that the optoelectronic measuring device cannot detect a zone due to the known fastening system.

The known fastening system can furthermore have the effect that the optoelectronic measuring device is greatly spaced apart from a stationary construction to which the known fastening system is fastened so that for specific applications the optoelectronic measuring device cannot be used with the associated fastening system due to a lack of space.

In addition, access is needed for the required tool for an attachment of the known fastening system to the optoelectronic measuring device and in the operating position, whereby the mounting of the known fastening system and of the optoelectronic measuring device is made more difficult or is even impossible in some applications.

SUMMARY

It is an object of the invention to provide a fastening system for fastening an optoelectronic measuring device, in particular a light grid, in an operating position by which a simple mounting and alignment of the measuring device is possible.

The object is satisfied in accordance with the invention by a fastening system for fastening an optoelectronic measuring device, in particular a light grid, in an operating position comprising a fastening section that is provided at a surface of a housing of the measuring device and an adjustment adapter that has a first element for connection to the fastening section and that is provided for the alignment of the measuring device in the operating position, wherein the fastening section rises from the surface of the housing and forms a platform that has a groove and a latch cutout at at least one side located perpendicular to the surface of the housing, and wherein the first element of the adjustment adapter has a tongue element formed with shape matching to the groove and a latching protrusion formed with shape matching to the latch cutout, whereby the fastening section and the adjustment adapter can be latchingly connected to one another without tools.

Since the fastening section is advantageously provided at an end cap or at a rear wall of the housing, a very compact design of the total fastening system results. The technical advantage results from this that a blind zone of the optoelectronic measuring device can be avoided on a mounting of the optoelectronic measuring device by means of the fastening system in the operating position.

In accordance with a preferred embodiment, the fastening section comprises four platforms of which two respective ones form a groove and an intermediate space between the two platforms forming a groove forms the latching protrusion. The manufacture of the fastening section is possible in a simple manner by injection molding of the end cap or of the housing of the optoelectronic measuring device. A mounting of the fastening system to the optoelectronic measuring device is furthermore possible without tools due to an engagement of the latching protrusion in the latch cutout.

In accordance with a preferred embodiment, the adjustment adapter furthermore has a second element.

The second element is in particular advantageously connected to the first element at an angle, in particular of 90°, to one another. In addition, the second element advantageously has a round spigot that can be placed into a holder, whereby a rotation of the optoelectronic measuring device can be carried out. In this respect, the holder can preferably be mounted at a stationary construction such as a wall or a frame. Since the fastening device can be mounted at the stationary construction via the second element or via the holder, very varied mounting possibilities result for the optoelectronic measuring device.

The second element furthermore in particular engages around the first element such that the first element is pivotably supported in the second element. The fastening system can herby enable a pivoting of the optoelectronic measuring device despite an even more compact design. The second element can advantageously be mounted at a stationary construction or can be placed into a holder that can be mounted at the stationary construction. Further different mounting possibilities thereby result for the optoelectronic measuring device.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

Figure 1:
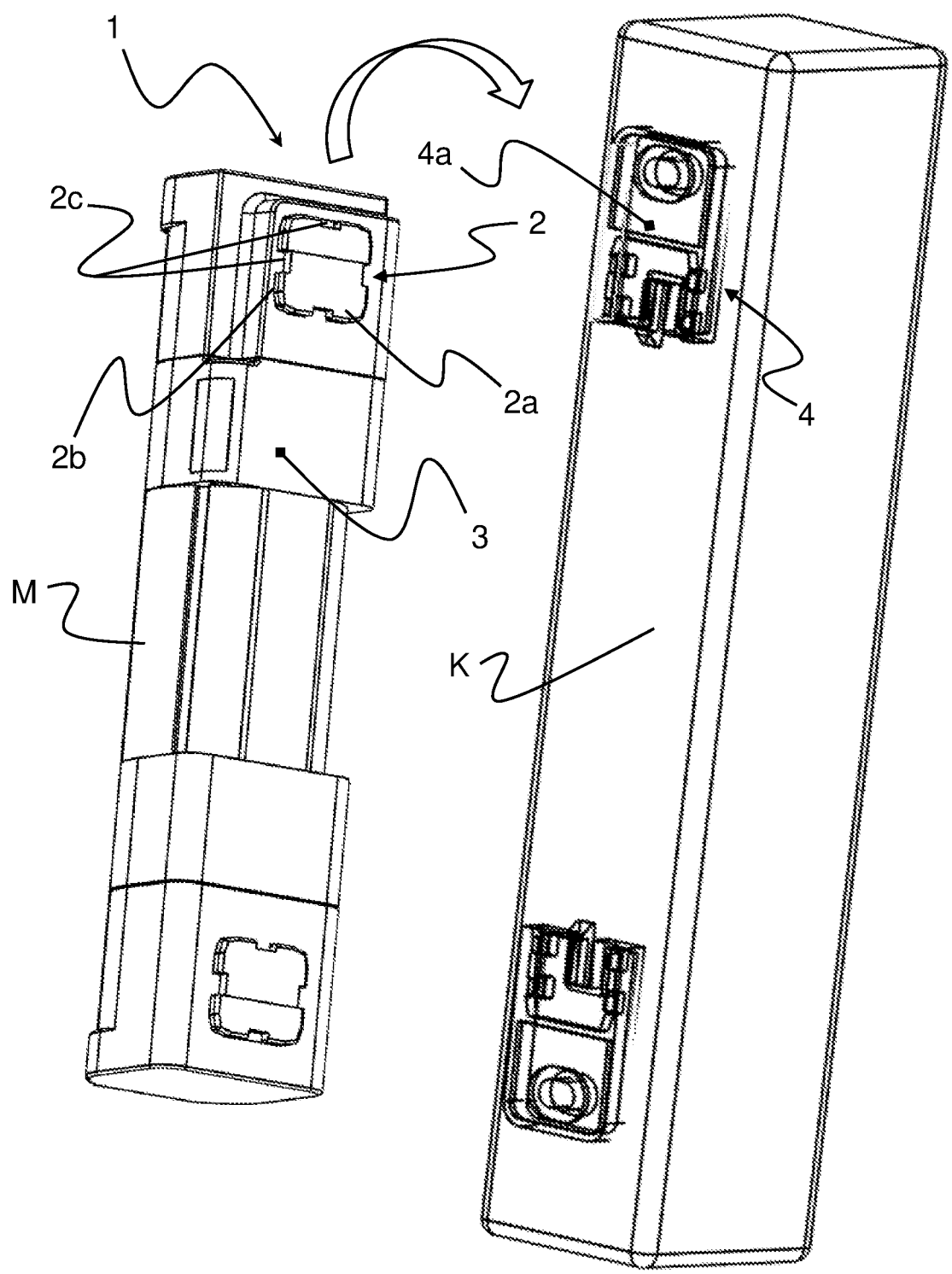
FIG. 1 a schematic rear view of an optoelectronic measuring device having a preferred embodiment of a fastening system in accordance with the invention.

FIG. 1 schematically shows a rear view of an optoelectronic measuring device M to be mounted at a stationary construction K having a preferred embodiment of a fastening system 1 in accordance with the invention. In the embodiment shown, the optoelectronic measuring device M represents a light grid that is to be mounted at a wall piece as the stationary construction K in accordance with the direction of the white arrow.

The fastening system 1 comprises a fastening section 2 that is provided at a surface of a housing 3 of the optoelectronic measuring device M. In this respect, the fastening section 2 rises from the surface of the housing 3 and forms a platform 2a shown in more detail in FIG. 2. In accordance with the invention, the platform 2a has a groove 2b and a latch cutout 2c at at least one side located perpendicular to the surface of the housing 3.

Figure 3:
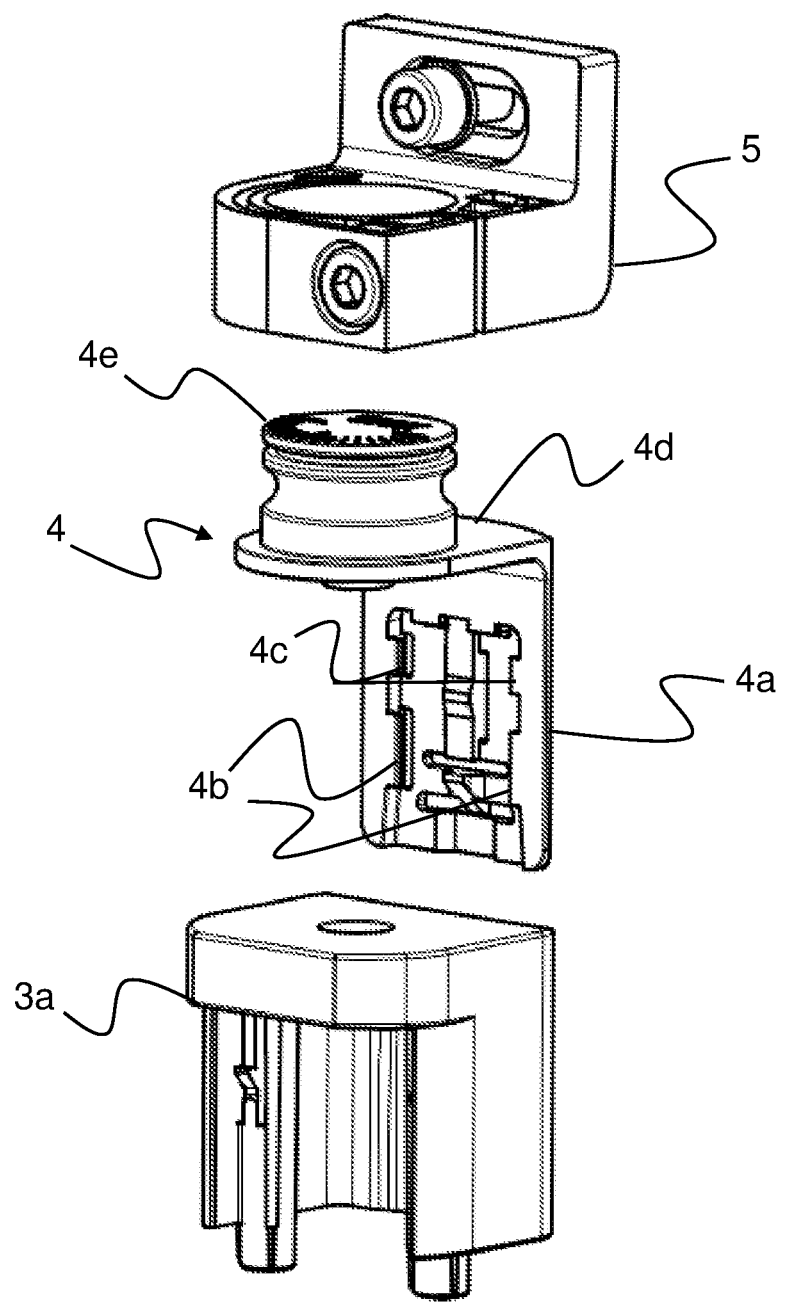
FIG. 3 a perspective exploded view of a preferred embodiment of the fastening system in accordance with the invention.

The fastening system 1 further comprises an adjustment adapter 4 that has a first element 4a for connection to the fastening section 2 and that is provided for the alignment of the measuring device M in the operating position. The first element 4a of the adjustment adapter has a tongue element 4b that, as shown in FIG. 3, is configured with shape matching to the groove 2b of the platform 2a of the fastening section 2. The first element 4a of the adjustment adapter 4 furthermore has a latching protrusion 4c that, likewise as shown in FIG. 3, is configured with shape matching to the latch cutout 3c of the platform 2a of the fastening section 2, whereby the fastening section 2 and the adjustment adapter 4 are latchingly connectable to one another without tools.

In the shown embodiment in FIG. 1, the first element 4a of the adjustment adapter 4 makes possible a linear alignment of the optoelectronic measuring device M along its longitudinal axis.

Figure 2:
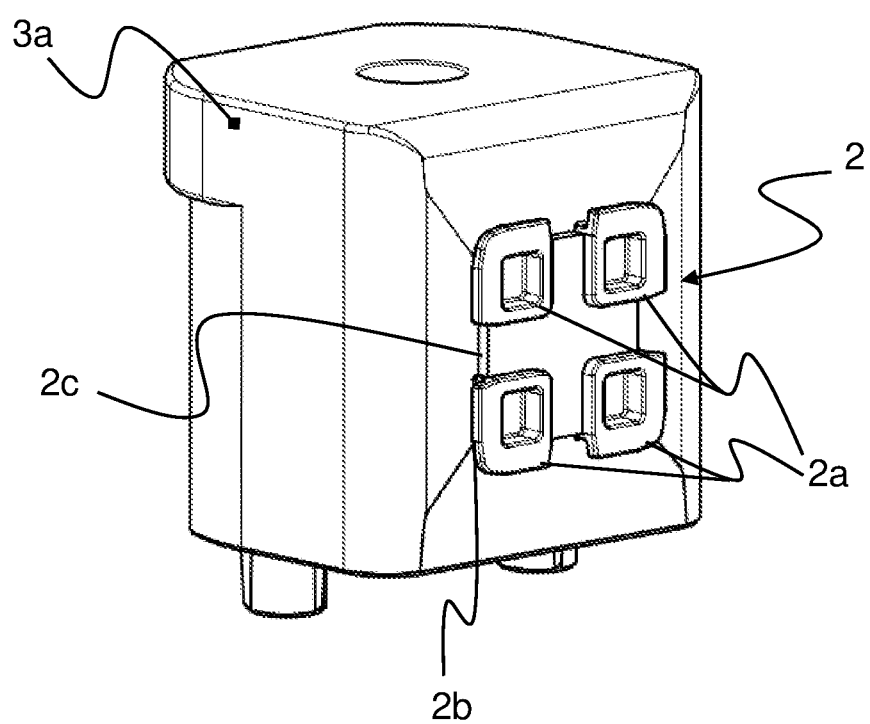
FIG. 2 a schematic perspective view of an embodiment of a fastening section.

A schematic perspective view of an embodiment of the fastening section 2 is shown in FIG. 2, with the fastening section 2 in this embodiment being provided at an end cap 3a of the housing 3 of the optoelectronic measuring device M. The fastening section 2 shown in particular comprises four platforms 2a of which two respective ones 2b form a groove 2b and an intermediate space between the two platforms 2a forming a groove 2b forms the latch cutout 2c.

The groove 2b serves to guide the adjustment adapter 4 during the placing onto the fastening section 2 so that the adjustment adapter 4 cannot cant with the fastening section 2. A placing together of the fastening system 1 can hereby be carried out simply.

FIG. 3 shows a perspective exploded view of a preferred embodiment of the fastening system 1 in accordance with the invention in which the non-visible fastening section 2 is provided at the end cap 3a of the housing 3. From the perspective shown, the tongue elements 4b and the latching protrusions 4c of the first element 4a of the adjustment adapter 4 can be clearly recognized that ensure an exact guidance of the adjustment adapter 4 on the placing onto the fastening section 2 and a firm latching of the latching protrusions 4c into the latch cutouts 2c of the fastening section 2.

The embodiment of the adjustment adapter 4 shown has a second element 4d that is preferably connected to the first element 4a at an angle, in particular of 90°, to one another. The second element 4d has a round spigot 4e that can be placed into a holder 5, whereby a rotation of the optoelectronic measuring device M about its longitudinal axis can be carried out in its operating position.

The holder 5 can be mounted at a stationary construction K or at the wall piece so that the fastening system 1 is fixedly mounted together with the optoelectronic measuring device M or the light grid in the operating position of the optoelectronic measuring device M. In this respect, the round spigot 4e enables an exact alignment of the optoelectronic measuring device M to a zone to be detected.

Figure 4:
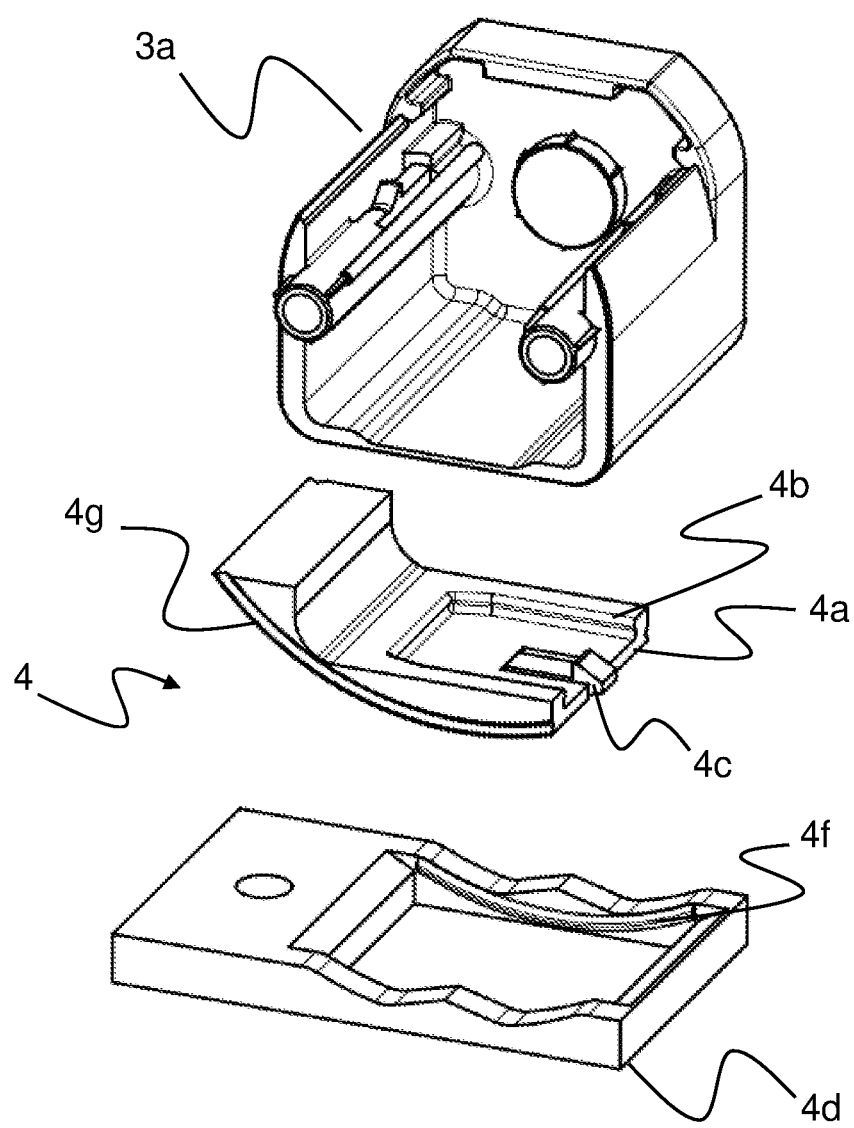
FIG. 4 a perspective exploded view of a further preferred embodiment of the fastening system in accordance with the invention.

In accordance with FIG. 4, a perspective exploded view of a further preferred embodiment of the fastening system 1 in accordance with the invention is shown in which the non-visible fastening section 2 is likewise provided at the end cap 3a of the housing 3 of the optoelectronic measuring device M.

Unlike the embodiment of the fastening system 1 shown in FIG. 3, the first element 4a of the adjustment adapter 4 can be placed on transversely to the longitudinal axis of the optoelectronic measuring device M. The second element 4d furthermore engages around the first element 4a such that the first element 4a is pivotably supported in the second element 4d.

The first element 4a in this embodiment also has the tongue elements 4b by which the adjustment adapter 4 can be exactly placed onto the fastening section 2. The latching protrusion 4 is configured in the form of a tongue arm that engages into the corresponding latch cutout 2c of the fastening section 2 and fixes the first element 4a in the platform 2a of the fastening section 2.

The second element 4d has guide grooves 4f at its inner side so that side edges 4g of the first element 4a can be guided in these guiding grooves 4f, whereby the first element 4a is pivotably supported with respect to the second element 4d. The optoelectronic measuring device M placed onto the first element 4a can hereby be pivoted with respect to the second element 4d so that the optoelectronic measuring device M can be aligned in its operating position when the fastening system 1 is mounted above the second element 4d at the stationary construction K.

In this embodiment, the holder 5 can be dispensed with so that the total fastening system 1 is very narrow and compact, whereby the fastening system 1 together with the optoelectronic measuring device M hardly requires any space to be mounted in the operating position.

REFERENCE NUMERAL LIST 1 fastening system
2 fastening section
2a platform
2b groove
2c latch cutout
3 housing
3a end cap
adjustment adapter
4a first element
4b tongue element
4c latching protrusion
4d second element
4e spigot
4f guide groove
4g side edge
5 holder
K stationary construction
M optoelectronic measuring device

The invention claimed is:

1. A fastening system for fastening an optoelectronic measuring device in an operating position, the fastening system comprising
a fastening section that is provided at a surface of a housing of the optoelectronic measuring device; and
an adjustment adapter that has a first element for connection to the fastening section and that is provided for the alignment of the optoelectronic measuring device in the operating position, wherein the fastening section rises from the surface of the housing and forms a platform that has a groove and a latching cutout at at least one side located perpendicular to the surface of the housing; and wherein the first element of the adjustment adapter has a tongue element configured with shape matching to the groove and a latching protrusion configured with shape matching to the latching cutout, whereby the fastening section and the adjustment adapter are guided in an exact manner and firmly latching so as to connect to one another without tools.

2. The fastening system in accordance with claim 1, wherein the optoelectronic measuring device is a light grid.

3. The fastening system in accordance with claim 1, wherein the fastening section is provided at an end cap.

4. The fastening system in accordance with claim 1, wherein the fastening section is provided at a rear wall of the housing.

5. The fastening system in accordance with claim 1, wherein the fastening section comprises four platforms of which two respective ones form a groove and an intermediate space between the two platforms forming a groove forms the latching cutout.

6. The fastening system in accordance with claim 1, wherein the adjustment adapter has a second element.

7. The fastening system in accordance with claim 6, wherein the second element is connected to the first element at an angle to one another.

8. The fastening system in accordance with claim 7, wherein the second element is connected to the first element at an angle of 90°.

9. The fastening system in accordance with claim 6, wherein the second element has a round spigot that can be placed into a holder, whereby a rotation of the optoelectronic measuring device can be carried out.

10. The fastening system in accordance with claim 9, wherein the holder can be mounted at a stationary construction.

11. The fastening system in accordance with claim 6, wherein the second element engages around the first element such that the first element is pivotably supported in the second element.

12. The fastening system in accordance with claim 10, wherein the second element can be mounted at a stationary construction or can be placed into a holder that can be mounted at the stationary construction.

\* \* \* \* \*